United States Patent [19]

Fujiwara et al.

[11] 4,300,588

[45] Nov. 17, 1981

[54] STEAM TRAP WITH SPHERICAL INVERTED BUCKET FLOAT

[75] Inventors: Katsuji Fujiwara, Kakogawa; Osamu Miyata, Hyogo; Tadashi Oike, Kasai, all of Japan

[73] Assignee: TLV Co., Ltd., Tokyo, Japan

[21] Appl. No.: 119,491

[22] Filed: Feb. 7, 1980

[30] Foreign Application Priority Data

Feb. 17, 1979 [JP] Japan .................................. 54-17724
Apr. 18, 1979 [JP] Japan .................................. 54-48438
Apr. 27, 1979 [JP] Japan .................................. 54-52799

[51] Int. Cl.³ .............................................. F16T 1/30
[52] U.S. Cl. .................................... 137/185; 137/429
[58] Field of Search ................. 137/185, 192, 433, 429

[56] References Cited

U.S. PATENT DOCUMENTS

| 1,787,465 | 1/1931 | Armstrong | 137/185 |
| 1,904,393 | 4/1933 | Travis | 137/185 |
| 2,013,015 | 9/1935 | Vincent | 137/192 |
| 3,489,348 | 1/1970 | Fujiwara | 137/192 X |

FOREIGN PATENT DOCUMENTS

122713 11/1946 Australia ........................ 137/185

*Primary Examiner*—Alan Cohan
*Attorney, Agent, or Firm*—Toren, McGeady & Stanger

[57] ABSTRACT

A steam trap assembly is formed with a casing defining a valve chamber therein with an inlet for introducing fluid generally consisting of condensate and steam into said chamber and with an outlet for discharging condensate from the chamber. A bucket-type float freely movable within the valve chamber is formed with an outer surface portion adapted to engage and disengage a valve seat defining the orifice of an outlet passage through which condensate is discharged from said steam trap. The float is structured as a hollow shell member defining a downwardly directed opening and with a generally continuous body having a substantially spherical configuration extending to a mouthpiece member which is fitted in the opening of the spherical shell member to define the opening with a generally circular configuration. The mouthpiece member has a weight characteristic tending to bias the center of gravity of the float member downwardly toward the opening.

5 Claims, 9 Drawing Figures

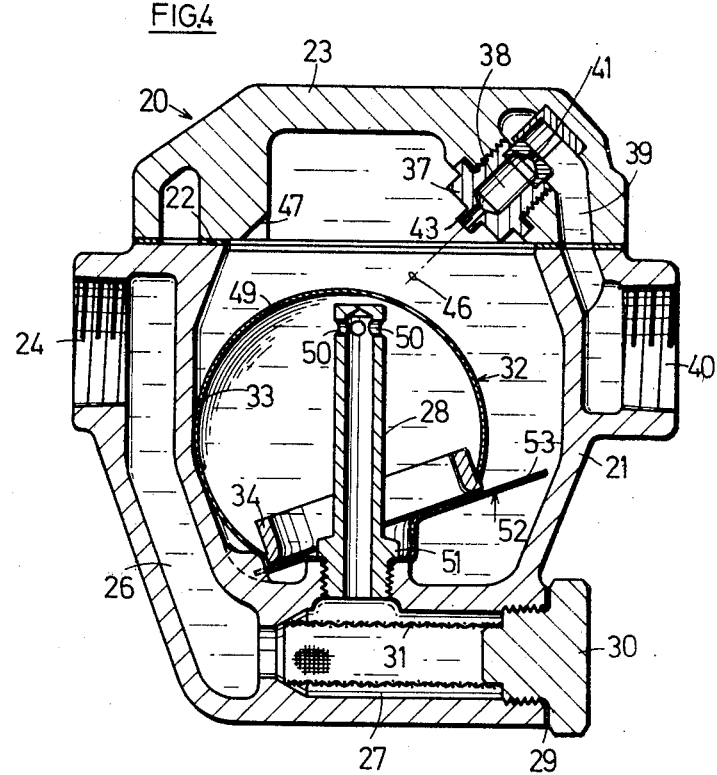
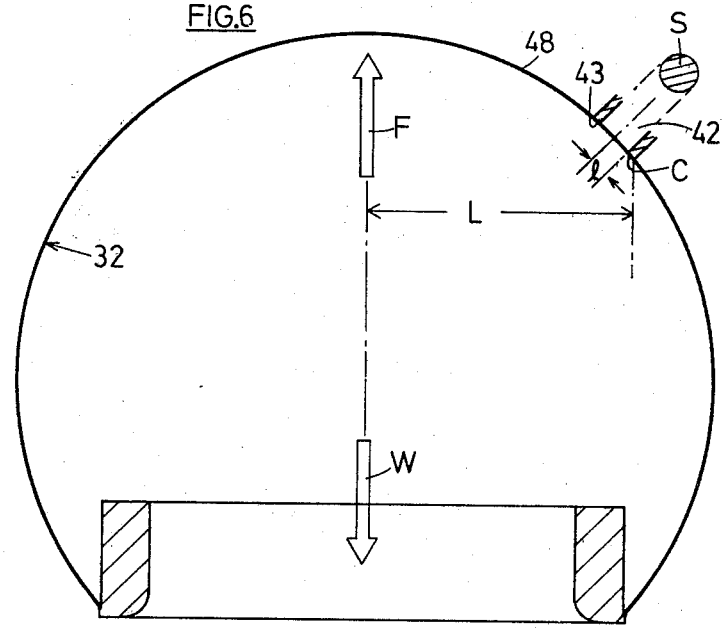

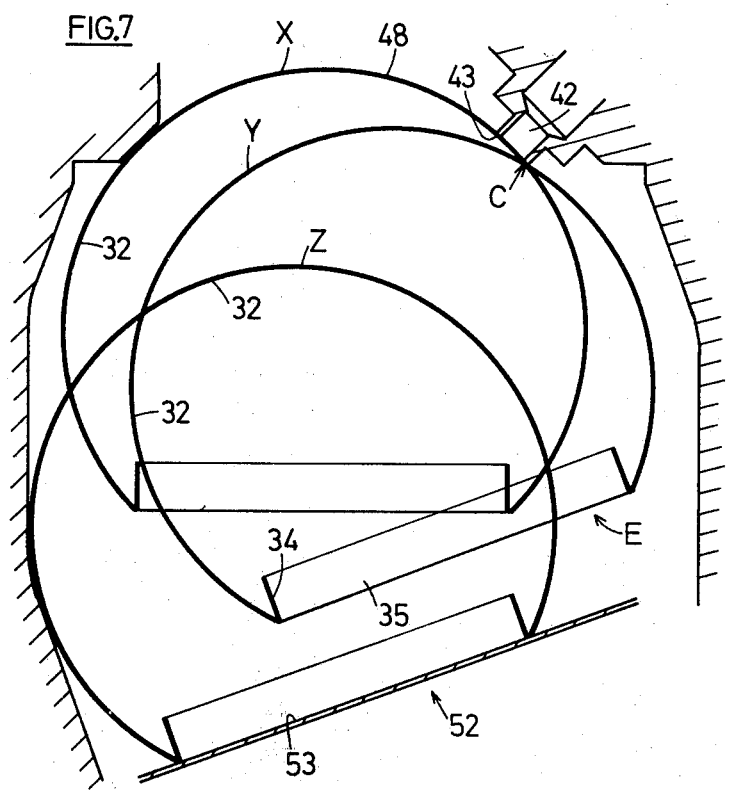

STEAM TRAP WITH SPHERICAL INVERTED BUCKET FLOAT

The present invention relates generally to the construction of a steam trap operative to discharge condensate in a system utilizing steam equipment and the invention is more particularly directed to a steam trap of the type utilizing a bucket float having a downwardly directed opening.

In steam traps of the type to which the present invention relates, the float member utilized is normally shaped as an inverted bucket which has a downwardly directed opening and which floats within the trap to open and close the discharge valve. When the bucket is full of condensate it tends to sink to the bottom of the trap and open the valve. However, when the bucket is filled with steam, it will float and close the output valve of the steam trap.

In conventional bucket float steam traps, the float member is mounted on a lever which has fitted therewith a valve member for opening and closing the discharge opening. The bucket float is usually fixed to the lever end and as the float moves upwardly and downwardly within the valve chamber, opening and closing of the discharge passage occurs.

However, it has been found that a construction of this type wherein the float member is mechanically connected with the output valve structure by means of the lever mechanism is rather complex and gives rise to disadvantages due to the high cost of manufacture involved and because of wear occurring on the lever mechanism, the valve member and the surface of the valve seat.

To eliminate disadvantages arising in lever-connected bucket floats of the aforementioned type, a free-floating bucket float was developed in the prior art as described in Japanese utility model Pat. No. 1,283,246 wherein a bucket float consisting of a generally hemispherical shell is contained within the chamber of a steam trap in a free-floating arrangement. In this prior art device, the shell member constituting the bucket float is freely placed within the steam trap chamber without the utilization of mechanical means mounting or connecting the float with the valve casing or with the outlet valve mechanism through linkages such as a valve operating lever. When the steam content within the float is sufficient to cause the float to rise, the float will engage a valve seat located in the upper region of the steam trap thereby to close the outlet orifice by abutment therewith of the outer surface of the bucket float.

However, even in free-floating bucket float steam traps of this type, other disadvantages occur. Observation of the behaviour of the bucket float within the valve chamber will show that the bucket float generally will not rise vertically in the chamber but will tend to tilt and engage against the walls defining the interior of the steam trap chamber during operation of the steam trap. As a result, the configuration of the float may adversely affect the operation of the steam trap and it may, indeed, cause malfunction thereof as a result of the engagement of the float against the sidewalls of the steam trap chamber.

Accordingly, the present invention is directed toward providing a steam trap utilizing a free-floating bucket float which is generally more reliable than prior art structures with regard to its operation, which will be more durable with regard to wear of the valve member and the valve seat, which is generally simple in construction and smaller in size and which will be found to be relatively less expensive to manufacture.

SUMMARY OF THE INVENTION

The present invention may be briefly described as a steam trap assembly comprising a casing defining a valve chamber therein, inlet means for introducing fluid generally consisting of condensate and steam into the chamber, outlet means defining an outlet passage for discharging condensate from the chamber, the outlet means including means defining a valve seat located on the interior of the chamber at the upper portion thereof, said valve seat means forming a valve orifice consisting the initial portion of the outlet passage, and a float freely movable within the valve chamber and having an outer surface portion adapted to engage and disengage the valve seat means for opening and closing the outlet passage.

The invention is particularly directed to the configuration of the float which is structured as a hollow shell member defining a downwardly directed opening and a generally continuous body having a substantially spherical configuration, with a mouthpiece member being fitted in the opening to define the opening with a generally circular configuration, the mouthpiece member having a weight characteristic tending to bias the center of gravity of the float toward the opening.

As a result of the present invention it is possible to achieve certain objectives in the operation of steam traps involving a bucket type float which is freely movable within the steam trap chamber. By utilization of the principles of the present invention, the bucket float is made of a spherical shell configuration and it is provided with a circular inlet opening with the mouthpiece member fitted therein in order to bias the center of gravity downwardly toward the bucket float opening. Although the structure of the invention provides several advantages not attainable with the prior art, it nevertheless continues to provide simple construction without pins and levers since it enables a free-floating bucket float to be utilized and since it makes the steam trap easy to manufacture at lower cost. However, because of the configuration of the bucket float of the invention, more reliable operation of the steam trap occurs and there is less likelihood of impairment of the steam trap operation as a result of misorientation of the float within the steam trap chamber and snagging of the float against the chamber walls.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 4 is a cross sectional view showing the steam trap assembly of FIG. 3 in the open position with the float located accordingly;

FIG. 6 is a generally schematic diagram of the bucket float of the present invention which may be utilized to better explain the relationship between the buoyant forces, gravity and fluid pressure exerted upon the float;

FIG. 7 is a generally schematic diagram showing the spherical bucket float of the present invention in order to depict the behavioural characteristics thereof;

DETAILED DESCRIPTION OF THE PREFERRED EMBODIMENT

Figure 1:
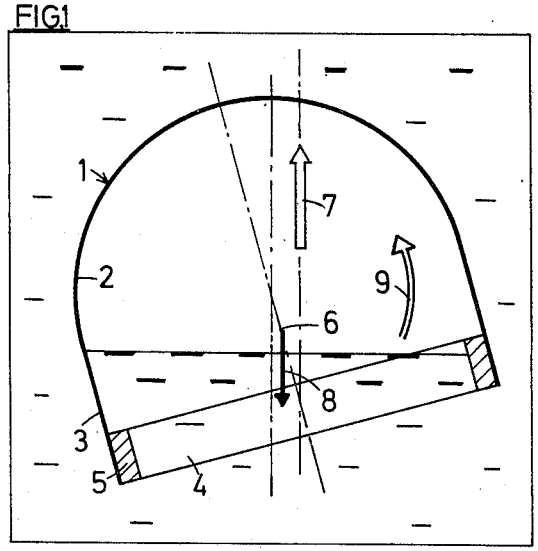
FIG. 1 is a schematic side elevation depicting a bucket float formed of a hemispherical shell with a cylindrical skirt welded thereto and representing the flotation characteristics of bucket floats of the type to which the present invention relates.
Figure 2:
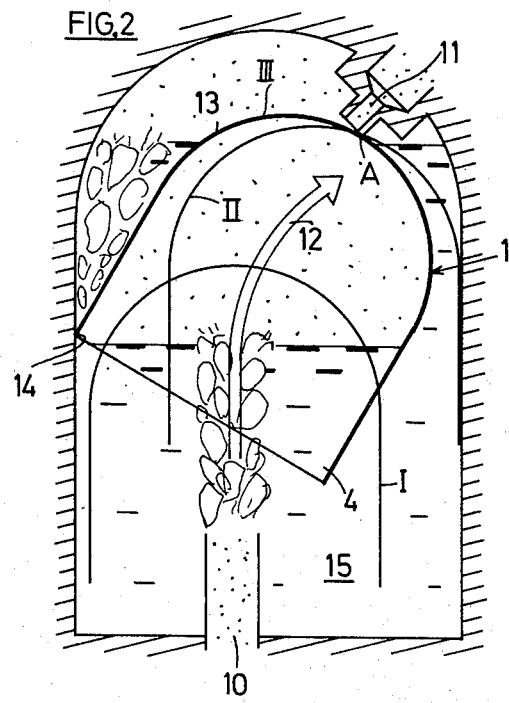
FIG. 2 is a schematic side elevation which depicts the behaviour of the bucket float shown in FIG. 1 within a valve chamber.

A steam trap assembly of the general type to which the present invention relates is schematically shown in FIGS. 1 and 2. As indicated in FIG. 1, this type of steam trap is normally arranged to include a bucket float 1 which is shown in FIG. 1 in its inclined position while floating in condensate. The bucket float 1 is formed of a hemispherical shell 2 and a skirt 3 which are welded together. A mouthpiece 5 is fitted to the bottom of the skirt 3 in order to bias the center of gravity 6 of the bucket float toward the inlet opening 4. When the float 1 tilts, the action line of the buoyant force 7 is translated toward the direction in which the skirt protrudes. As seen in FIG. 1, if the buoyant force 7 extends beyond the action line of gravity force 8, a counterclockwise movement is developed as indicated in FIG. 1 which will cause the float 1 to upset. The greater the biasing of the center of gravity 6 of the float toward the inlet piece 4, the less will be the possibility that the float will tend to become upset. Therefore, it will be apparent that the bucket float 1 which is formed of the hemispherical shell indicated in FIGS. 1 and 2 with the cylindrical skirt should be provided with a relatively long skirt 3 so that the float may tend to resist becoming upset.

Observation of the behaviour of the bucket float in the valve chamber will show that the bucket float 1 will start to float from the bottom position indicated in fine-line form I in FIG. 2 when steam tends to accumulate in the float after having flowed through the flow passage 10. At this time, however, the float will not rise vertically but will tend to rise while being attracted toward the orifice 11, as shown by the arrow 12 in FIG. 2. This occurs due to the flow toward the orifice 11. The float will first contact a bottom edge A of the valve seat with its point adjacent to the top of the spherical outer surface 13 as shown in fine-line II, and it will roll on the surface of the valve seat in order to come to the completely closed position of the orifice 11. As a result, when the float 1 occupies the position indicated in full-line III, the bottom edge of the float 14 will abut the internal wall of the valve chamber 15 and the surface of the valve seat will resist rolling of the float 1, thereby making it impossible to completely close the orifice 11. Steam coming into the float 1 through the inlet passage 10 will overflow through the inlet opening of the float 4 and it will blow out through the orifice 11 and this action will be difficult to prevent.

Figure 3:
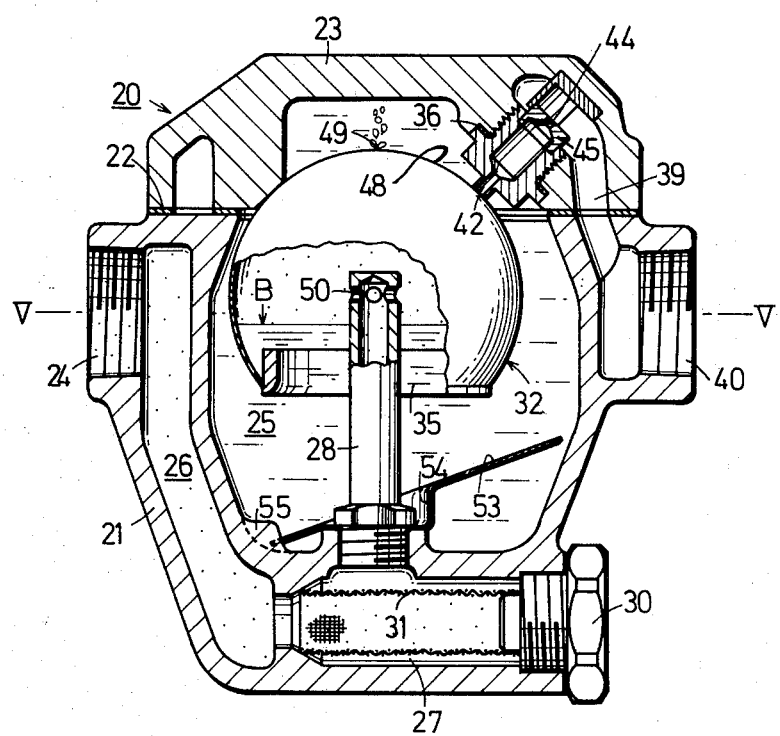
FIG. 3 is a cross sectional view showing a steam trap assembly in accordance with the present invention utilizing a free-floating bucket float, the steam trap being shown in the closed position.
Figure 5:
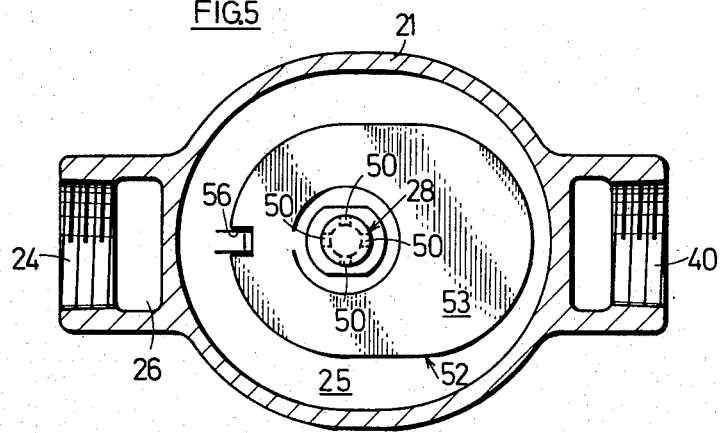
FIG. 5 is a lateral sectional view of the steam trap shown in FIG. 3 taken along the line V—V.

A bucket type steam trap which is considered to represent the best configuration embodying the principles of the present invention is depicted in FIGS. 3–5. As indicated therein, a bucket type steam trap 20 is shown to consist of a body 21 and a cover 23 fastened thereto by means of bolts (not shown) with a gasket 22 being inserted therebetween in order to insure adequate tightness. An inlet 24 is threaded to enable engagement therein of a pipe which may operate to provide condensate formed in steam equipment to be introduced into the trap 20. A valve chamber 25 is defined by the casing of the steam trap as a space having a lateral sectional configuration which is oval as indicated in FIG. 5.

The inlet 24 is connected with the valve chamber 25 through a downwardly extending passage 26 formed exteriorally of the chamber wall with a horizontal passage 27 being provided beneath the bottom wall of the valve chamber 25 and with an inlet pipe 28 threaded into the bottom of the valve chamber 25, the inlet pipe 28 being in communication with the valve chamber 25 through discharge orifices 50 provided near the top of the pipe 28. At the open end of the horizontal passage 27, a plug 30 is threadedly engaged with a gasket 29 being inserted therebetween for tightness. A cylindrical filter 30 is arranged in the horizontal passage 27, with one end thereof fitted to a boss provided at the inner end of the plug 30. In the valve chamber 25, a float 32 is freely provided, with the float 32 being formed as a bucket having a downwardly directed opening.

The bucket float 32 is formed of a thin metallic spherical shell member 33 and a mouthpiece 34. The spherical shell member may be made in a manner such that two hemispherical shells are placed together with both their open ends facing each other. The shells may then be welded together and finished by a grinding process so that they may be formed into a spherical outer surface with a cut-off section in order to provide the inlet opening and in order to enable the mouthpiece 34 to be fitted thereto.

The mouthpiece 34 is essentially formed as an annular member which is welded to the inlet opening of the spherical shell member 33. The mouthpiece is structured to have weight characteristics such that the center of gravity of the spherical shell member 33 is biased from the center thereof toward the inlet opening 35 in order that the bucket float will tend to float in water with the inlet opening 35 extending downwardly and so that it will exhibit sufficient strength to prevent deformation of the shell member 33.

A valve member 37 is threadedly engaged into the inner side of the cover 23 and a gasket 36 is inserted therebetween for tightness. The valve seat member 37 defines an orifice chamber 38 which communicates with an outlet 40 through an outlet passage 39 provided in the cover 23 and the body 21. The outlet 40 is threaded in order to enable a discharge pipe to be engaged therein. In order to prevent erosion due to the discharge jet which may be formed through the orifice chamber 38, a wear-resistant wall member 41 is provided at the portion of the outlet passage 39 opposing the tapped hole for the valve seat member 37.

A valve orifice 42 is formed in an extruded annular valve seat 43 located at the side of the orifice chamber 38 facing the valve chamber 25.

At the side of the outlet passage 39 adjacent the orifice chamber 38 there is provided a plug member 45 having an orifice 44. The orifice 44 has a circular configuration the radius of which may be identical to or smaller than that of the valve orifice 42. The axis 46 of the orifice chamber 38 is inclined at an angle of 45° relative to a vertical line.

A float seat 47 is provided opposite to the valve orifice 42 on the internal surface of the cover 23, the seat 47 being formed in a cylindrical surface whose axis is common to that of the orifice chamber 38 and whose radius is equal to that of the spherical shell member 33. This enables the float seat 47 to be finished with a setting which is the same as that for the tapped hole for the valve seat member 47. When the outer spherical surface 48 of the spherical shell member 33 of the bucket float 32 touches the valve seat 43 and closes the valve orifice 42, the float seat 47 will assist the bucket float 32 to assume a correct position tending to enable complete closure of the valve orifice 42.

A small vent hole 49 is provided at the top of the bucket float 32. The inlet pipe 28 is extended into the bucket float 32 through an inlet opening 35 and it is provided with exit holes (see FIG. 5) radially at the upper part thereof.

The inner bottom edge of the mouthpiece 34 is rounded and it is smoothly finished so that it may readily slide on the inlet pipe 28 if the bucket float 32 should become tilted and abut against the inlet pipe 28. The inlet pipe 28 is threaded onto the bottom wall of the valve chamber 25 so that an inclined bottom member 52 may be affixed between a brim 51 of the inlet pipe 28 and the valve chamber bottom wall. The inclined bottom plate 52 is configured in its overall dimension as an oval plate 53 which is provided with a depression 54 in order to receive a brim 51 of the inlet pipe 28 and a recess 56 at one end of the plate member 52 operates to have fitted therein a protuberance 55 located at the bottom of the valve chamber sidewall in order to effect proper positioning of the plate member 52.

As indicated in FIG. 4, the bottom plate 52 is inclined so that the side thereof located closest to the valve orifice 42 is higher than the opposite side thereof which is located at a lower elevation. Thus, the bucket float 32 when resting upon the inclined bottom plate member 52 will assume an inclined position with the top thereof located away from the valve orifice 42.

In the operation of the free-floating bucket type steam trap depicted in the drawings and discussed above, it will be seen that FIG. 3 indicates the closed condition of the steam trap wherein the bucket float 32 is located with its spherical outer surface 48 in abutment with the annular valve seat 43 in order to close the valve orifice 42. With the steam trap in this condition, the outer spherical surface 48 of the bucket float 32 will be guided by the float seat 47 which constitutes a cylindrical surface having an axis common to that of the valve orifice 42 with a radius equal to that of the float 32.

Steam introduced through the inlet 24 will pass through the passage 26 and through the horizontal passage 27 through the inlet pipe 28 and it will enter the bucket float 32 through the discharge orifices 50. The steam will cause the bucket float 32 to be in the floating position so that the closed condition of the steam trap will be effected with fluid pressure pressing the spherical surface 48 against the valve orifice 42 so long as the steam introduced into the trap compensates a decrease in steam quantity in the float 32 due to condensation and leakage through the vent hole 49. Since steam will rise through the inlet pipe 48 and flow into the interior of the float 32, disturbance of the water level B is prevented and the float 32 will remain relatively stable.

When condensate entering the inlet 24 flows downwardly in the passage 26 and is accumulated in the horizontal passage 27, the steam supply in the bucket float 32 will be reduced or prevented and the quantity of steam in the bucket 32 will be decreased due to condensation and leakage through the vent hole 49. As the quantity of steam decreases, condensate flowing through the cylindrical filter 31 and through the inlet pipe 28 will discharge into the float through the outlet orifices 50 and the buoyant force applied against the float will be reduced.

FIG. 6 shows that if a buoyant force F decreases, the float 32 will tend to fall by the force of gravity W, with the float body tending to roll on the surface of the valve seat 43 thereby rotating in a counterclockwise direction.

If it is assumed that the float 32 drops while rotating counterclockwise about a point C at the bottom of the valve seat 43 as the instantaneous center of rotation thereof, then the float 32 will begin to open the orifice 42 when the product of the difference between the gravity force W and the buoyant force F and the distance L of the point C from the action line of the gravity force becomes larger than the product of the pressure differential ΔP between the valve chamber 25 and the outlet 40 multiplied by the sectional area S of the valve orifice and the distance l of the point C from the center line of the valve orifice 42.

Figure 8:
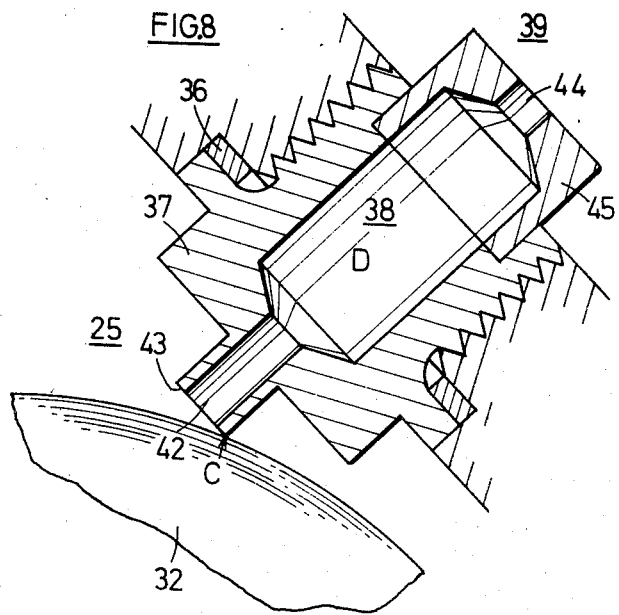
FIG. 8 is a detailed enlarged sectional view of the output valve assembly of the steam trap in accordance with the present invention.

Further, with reference to FIG. 7, the float 32 in the position indicated in full-line X will roll on the surface of the valve seat 43 and rotate counterclockwise with the point C of the valve seat 43 as the instantaneous center while gradually opening the valve orifice 42 and it will assume the position indicated in full-line Y. At this time, as indicated in FIG. 8, condensate will flow through the valve orifice 42 into the space D between the valve orifice 42 and the orifice 44, where the pressure will instantly rise due to flashing and the pressure differential ΔP across the valve orifice 42 is suddenly reduced. As a result, the bucket float 32 will easily move off the valve seat and it will fall, and the valve orifice will be fully open.

Referring again to FIG. 7, it will be seen that the float 32 will fall from the position indicated in full-line Y until it reaches the plate 53 of the inclined bottom plate member 52 with the bottom edge E of the mouthpiece 34, which defines the inlet opening 35, sliding downwardly along the inclined plate 53 so that the float will come to rest in a position indicated in full-line Z with its top away from the valve orifice 42. FIG. 4 depicts the trap in the fully opened condition.

Figure 9:
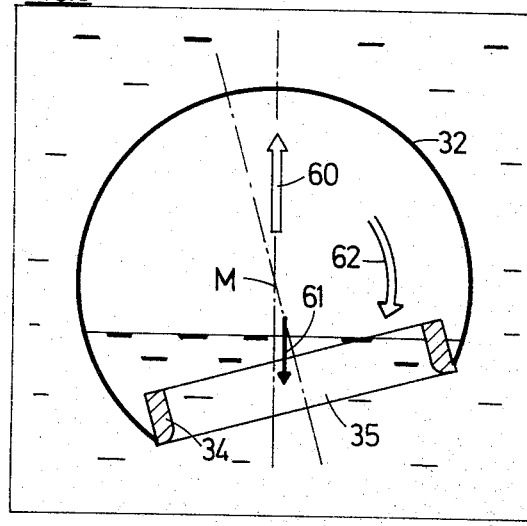
FIG. 9 is a generally schematic diagram depicting characteristics of the bucket float of the invention.

Condensate accumulated forwardly of the inlet 24 will flow through the passage 26, through the horizontal passage 27 and through the inlet pipe 28 into the float 32 and it will be exhausted out of the float 32 in order to flow between the bottom edge of the mouthpiece 34 and the inclined plate 53 thereafter being discharged through the valve orifice 42 and the outlet passage 39 to ultimately flow into the outlet 40. After some interval of this condensate discharge flow, steam will again enter the inlet 24 and flow through the passages 26 and 27 and through the inlet pipe 28 and the exhaust orifices 50 in order to become accumulated in the bucket float 32. As the accumulated steam increases in volume, the buoyant force acting on the bucket float 32 will increase causing the float to rise from its inclined position. FIG. 9 depicts the float in the inclined position while rising.

Because of the spherical configuration of the float 32, the buoyant force 60 will always lie on a vertical line through the center of the sphere M while the action point of the gravity force 61 will be biased toward the inlet opening 35. The resulting clockwise moment indicated by the arrow 62 will tend to cause the float to restore its position with the mouthpiece level instead of causing it to be upset. Although the float 32 will have a tendency to restore its normal position with the inlet opening level, the rising movement of the float will occur faster than its tendency to restore its position. As a result, the float 32, when touching the bottom edge of the valve seat 43, will be in a position which will still be inclined a sufficient extent as indicated by the full-line Y in FIG. 7. When rising due to the buoyant force, the bucket float 32 will be only slightly attracted toward the valve orifice 42 because of the gentle condensate flow due to the provision of the orifice 44. When the bucket float 32 rolls on the surface of the valve seat 43 and completely closes the valve orifice 42, the float 32 will assume a position with its inlet opening 35 level as indicated in full-line X in FIG. 7, this being a stable position inasmuch as a large quantity of steam will be contained within the float.

The free-floating bucket float type of steam trap 20 in accordance with the present invention will automatically discharge condensate while trapping steam, in the manner described above. The steam trap is characterized by the feature that the operation thereof will be reliable by virtue of the fact that the bucket float 32 wll not stick or become jammed on the inner wall of the valve chamber 25 or on the inlet pipe 28. Wear is minimized because the bucket float 32 simply rolls upon the surface of the valve seat 43 instead of effecting a sliding motion. Furthermore, the point on the spherical surface 48 of the float contacting the valve seat will be renewed at each operation so that repeated impact at the same point will not occur and so that the bucket float 32 and the valve chamber 25 within which it is contained may be relatively small compared with overall capacity of the steam trap.

While a specific embodiment of the invention has been shown and described in detail to illustrate the application of the inventive principles, it will be understood that the invention may be embodied otherwise without departing from such principles.

What is claimed is:

1. A steam trap assembly comprising: a casing defining a valve chamber therein; inlet means for introducing fluid generally consisting of condensate and steam into said chamber; outlet means defining an outlet passage for discharging condensate from said chamber, said outlet means including means defining a valve seat located on the interior of said chamber at the upper portion thereof, said valve seat forming a valve orifice constituting the initial portion of said outlet passage; a free-floating float member unconnected by any mechanical means with any part of said assembly so as to be freely movable within said valve chamber, said float member having an outer surface portion adapted to engage and disengage said valve seat for opening and closing said outlet passage; said float member being structured as a hollow shell member defining a downwardly directed opening with a generally continuous body having a substantially spherical configuration; and a mouthpiece member fitted in said opening to define said opening with a generally circular configuration, said mouthpiece member having a weight characteristic tending to bias the center of gravity of said float toward said opening to maintain the stability of said float without need for mechanical guidance or restraint.

2. A steam trap assembly according to claim 1 further comprising an inclined bottom member provided at the lower portion of said valve chamber, said bottom plate member being located to engage and support said float member when said float member is in its lowermost position away from said valve seat means and disengaged therefrom with said outlet passage opened.

3. A steam trap assembly according to claim 1 further comprising means defining an additional valve orifice located downstream of said valve orifice formed by said valve seat means, taken in the direction of condensate flow through said steam trap, said additional valve orifice having a cross-sectional area no larger than the cross-sectional area of said valve orifice defined by said valve seat means.

4. A steam trap assembly according to claim 1 wherein said spherical configuration of said float member extends substantially to and generally contiguous with said opening defined with a circular configuration by said mouthpiece member.

5. A steam trap assembly comprising: a casing defining a valve chamber therein; inlet means for introducing fluid generally consisting of condensate and steam into said chamber; outlet means defining an outlet passage for discharging condensate from said chamber, said outlet means including means defining a valve seat located on the interior of said chamber; a free-floating inverted bucket-type float unconnected by any mechanical means with any part of said assembly so as to be freely movable within said valve chamber, said float having an outer surface portion adapted to engage and disengage said valve seat for opening and closing said outlet passage; said float being structured as a hollow shell member defining a downwardly directed opening with a generally continuous body having a substantially spherical configuration; and means on said float imparting to said float a weight characteristic tending to bias the center of gravity thereof toward said opening to maintain the stability of said float without need for mechanical guidance or restraint.

* * * * *